H. R. JEROME.
Mole-Plow.
No. 25,121.
Patented Aug. 16, 1859.
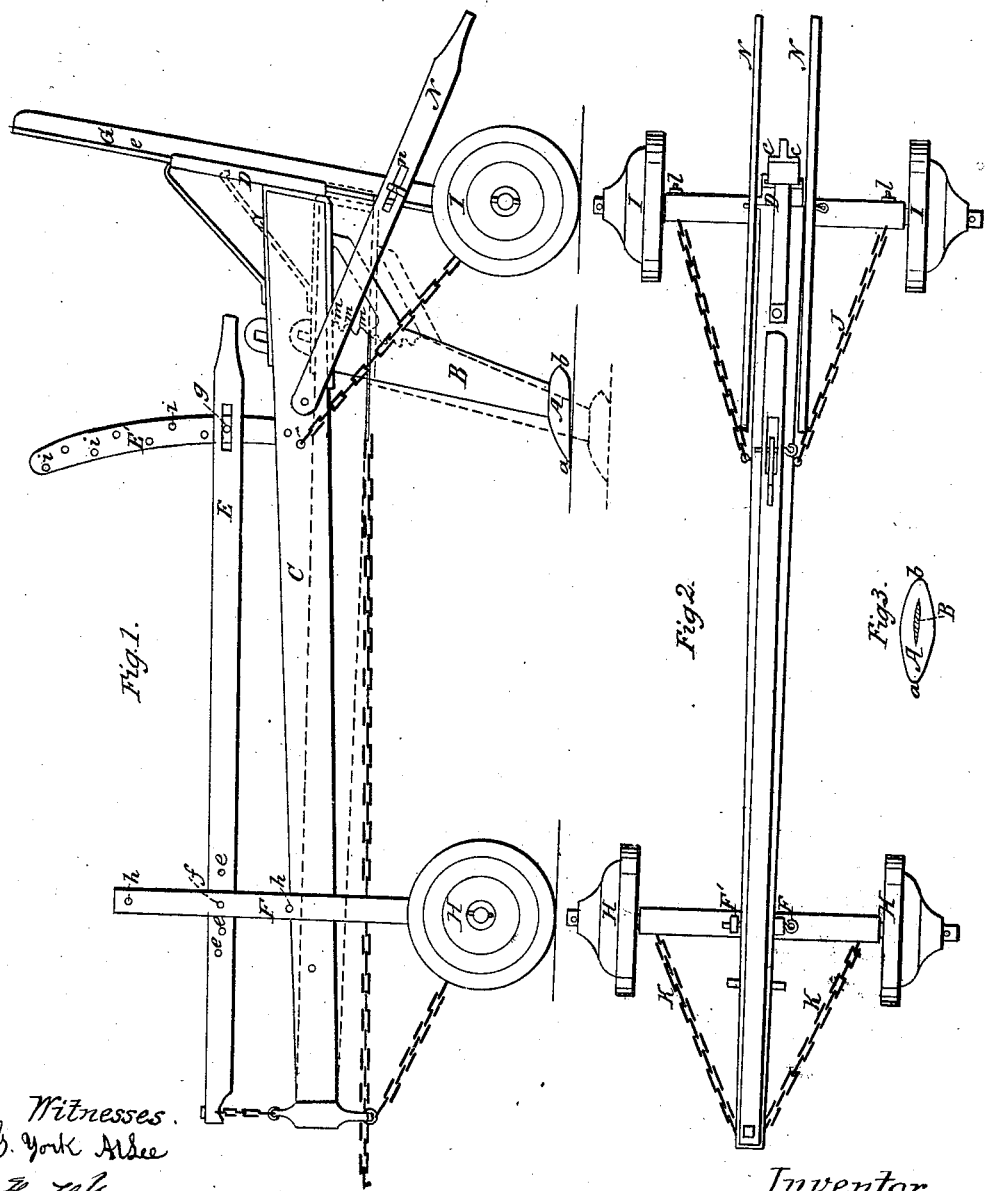

UNITED STATES PATENT OFFICE.

H. R. JEROME, OF MONROEVILLE, OHIO.

IMPROVEMENT IN MOLE-PLOWS.

Specification forming part of Letters Patent No. 25,121, dated August 16, 1859.

*To all whom it may concern:*

Be it known that I, H. R. JEROME, of Monroeville, in the county of Huron and State of Ohio, have invented a new and useful Improvement in Mole-Plows or Underground Draining-Machines; and I do hereby declare that the following is a full, clear, and exact description of the same, reference being had to the accompanying drawings, forming a part of this specification, in which—

Figure 1 is a side elevation of a mole-plow with my improvements applied to it. Fig. 2 is a plan of the same.

Similar letters of reference in each of the several figures indicate corresponding parts.

The nature of my invention consists in the arrangement of a beam carrying a mole-plow with the front and rear standards of the front and rear propelling-wheels, and with an adjusting device, in such a manner that no matter what be the adjustment of the front end of the beam for regulating the depth of the cut the rear end will be capable of accommodating itself thereto, and thus maintain a position at right angles to the colter, and consequently the advantage of having the bottom of the drain horizontal and the bottom of the mold rest square upon the soil while operating secured. Facilities for adjusting the whole machine so as to run with the colter clear of the ground are afforded.

My invention consists, second, in providing the colter with a series of notches and arranging the draft-chain in one or other of said notches, and thus having the draft applied directly to the colter, and consequently avoid liability of the colter being broken, as is the case when the draft is applied to the beam and the leverage thereof caused to act with a forward and downward thrust in a manner to snap the colter near the mold or near the point of attachment to the beam.

My invention consists, third, in the combination of a colter which is elliptical in form in its transverse section with a mold which is conical at its front and rear ends, whereby the colter and mold is capable of cutting both in its forward and backward movements, and thus in case the mold in its forward movement comes in contact with a stone the machine can be backed with ease and turned out of the line with said obstruction.

To enable others skilled in the art to make and use my invention, I will proceed to describe its construction and operation.

A represents the mold. It is of cone shape at its front end, $a$, and rear end, $b$. B is the colter. It is of elliptical shape or sharp at its front and rear edge, so as to cut back and forward. This colter is mortised into the mole, as represented.

C is the beam, to which the colter carrying the mold is attached firmly. This beam is combined by a grooved plate, D, and an adjusting device, E E' E$^2$, with the standards F, F', and G of front and rear propelling-wheels, H I, as shown. The grooved plate D is attached to the beam, and fits loosely over and round flanges $c\,c$ of the standard G, and is capable of sliding freely up and down on the same, but prevents lateral movement of the rear end of the beam. The front end of the beam plays up and down loosely between the standards F F', and is supported by a pivoted lever, E, which slides up and down over a curved adjustable arc, E', arranged on the top of the beam. The lever has its fulcrum in the standards F F', and its forward end attaches to the beam by a chain. It is by this arrangement that I am enabled to set the mole to cut any desired depth and yet have it run flat on its bottom and the beam always maintain a position at right angles to the mole, for by elevating or depressing the lever and setting the stop-pins $f\,g$ in the adjusting-holes $e\,e\,e\,h\,h\,h\,i\,i$ the forward end of the beam will be caused to descend or rise, and as soon as the machine is started the rear wheels and standard will rise or fall, and thus allow the beam to maintain its position at right angles to the colter, no matter what may be the character of the surface of the soil.

J J are brace-chains between the rear axle and the beam, and K K brace-chains between the front axle and the beam. The rear chains can be tightened up, in case they become too slack, by means of adjusting-screws $l\,l$, as shown.

L is the draft-chain. It attaches to the colter directly by means of notches $m\,m\,m$ formed on the same, as shown. This draft-chain passes loosely through an eye at the forward end of the beam and pulls directly upon the colter. Thus pulling upon the colter avoids all liability of the same snapping off, which, as the leverage of the beam and also the downward thrust of the same, which are brought to bear against the colter when the chain is attached to the beam, are completely obviated, and by having a series of notches, m m, on the colter the draft can be regulated as desired.

N N are handles pivoted to the rear of the beam and attaching by means of slots n and a pin to the standard G. By means of these handles the machine can be adjusted from the condition shown in red to the position shown in black in the drawings, or with the colter a little higher, so that it may be run from place to place with the colter clear of the ground.

What I claim as my invention, and desire to secure by Letters Patent, is—

1. The arrangement of a beam carrying a mole-plow with the front and rear standards of the front and rear propelling-wheels, and with the adjusting device, substantially as and for the purposes set forth.

2. Providing the colter with a series of notches and arranging the draft-chain in one or other of said notches, and thus having the draft applied directly to the colter, substantially as and for the purposes set forth.

3. The combination of a colter which is elliptical in form in its transverse section, with a mold which is conical at its front and rear ends, substantially as and for the purposes set forth.

The above specification of my improvement in mole-plows signed by me this 25th day of May, 1859.

H. R. JEROME.

Witnesses:
 G. YORKE AT LEE,
 H. H. YOUNG.